United States Patent

Jongenelis et al.

[11] Patent Number: 5,235,583
[45] Date of Patent: Aug. 10, 1993

[54] OPTICAL SCANNING FOR RECORD CARRIERS ADAPTED FOR READING WITH DIFFERING WAVELENGTHS

[75] Inventors: Adrianus P. J. M. Jongenelis; Gerard E. Van Rosmalen, both of Eindhoven, Netherlands

[73] Assignee: U.S. Philips Corporation, New York, N.Y.

[21] Appl. No.: 841,914

[22] Filed: Feb. 25, 1992

[30] Foreign Application Priority Data

Aug. 1, 1991 [EP] European Pat. Off. ........... 91201991

[51] Int. Cl.$^5$ ................................................. G11B 7/00
[52] U.S. Cl. .............................. 369/44.26; 369/44.27; 369/44.29; 369/44.37
[58] Field of Search ............... 369/44.26, 44.27, 44.29, 369/44.32, 44.37, 44.38

[56] References Cited

U.S. PATENT DOCUMENTS

| | | |
|---|---|---|
| 3,876,842 | 4/1975 | Bouwhuis . |
| 4,491,940 | 1/1985 | Tinet . |
| 4,754,339 | 6/1988 | Nagai et al. ...................... 369/44.38 |
| 4,843,601 | 6/1989 | Eguchi et al. ...................... 369/44.26 |

FOREIGN PATENT DOCUMENTS

| | | |
|---|---|---|
| 61-39248 | 2/1986 | Japan ................................ 369/44.26 |
| 283830 | 3/1990 | Japan . |

Primary Examiner—Aristotelis Psitos
Assistant Examiner—P. W. Huber
Attorney, Agent, or Firm—David R. Treacy

[57] ABSTRACT

A device in which a radiation source generates a radiation beam of a first wavelength. The scanning spot 7 generated by this radiation beam follows the centerline 13 of a track 8 to be scanned on a first type of record carrier designed for this wavelength. When a second type of record carrier is being read, in which the information is stored in a phase structure designed for a wavelength which is longer than the first wavelength, the read spot 7 follows the edge of a track 38 to be read instead of the centerline 18. In this way it is possible to generate a satisfactory information signal not only from the first type of record carrier but also from the second type of record carrier.

19 Claims, 9 Drawing Sheets

OPTICAL SCANNING FOR RECORD CARRIERS ADAPTED FOR READING WITH DIFFERING WAVELENGTHS

BACKGROUND OF THE INVENTION

The invention relates to a device suitable for scanning a first and a second type of optical record carrier in a first and a second mode, respectively, each type of record carrier having an information plane formed by a structure arranged in tracks and containing information. The first type of carrier is designed to be scanned by radiation of a first wavelength and the second type is a phase structure designed to be scanned by radiation of a second wavelength, the first wavelength being shorter than the second wavelength. Such a device comprises a radiation source for supplying a radiation beam of the first wavelength, a lens system for focusing the radiation beam to a scanning spot on the information plane, a first detection system for converting scanning spot radiation from the information plane into an information signal, and a tracking servosystem controlled by a tracking error signal for keeping the scanning spot on the centerline of a track to be scanned in the first mode.

The need for such a device has arisen due to the development of novel radiation sources which produce radiation at a shorter wavelength than has hitherto been common practice, such as short-wavelength laser diodes and radiation sources constituted by the combination of a conventional diode laser and a frequency doubler. If such a novel radiation source is used in a read device, this device may form a smaller read spot. As a result, it will be possible to read novel record carriers with smaller information details and a larger information density than usual. Due to the large numbers of conventional record carriers already in use, it is very desirable that the novel read device is also suitable for reading these record carriers.

A device of the type described in the opening paragraph is known from the abstract of the Japanese Patent Application no. 2-83830. This device can read record carriers with different information densities by adapting the dimension of the read spot on the information plane to the information density, i.e. the read spot is enlarged for reading a record carrier having larger information details. In the known device the spot is enlarged by moving a plane-parallel plate into the converging radiation beam. As a result, the focus of the beam shifts along the optical axis and enlarges the cross-section of the beam at the area of the information plane. A drawback of this method is that there is generally little space between the lens system and the record carrier so that the interpositioning of an additional plate involves a greater risk of the record carrier touching the plate and being damaged due to shocks against the device. Another drawback is that when changing the type of record carrier, a component, the plate in this case, must be displaced, which is quite cumbersome at a location where there is little space. Further, a phase structure in an information plane designed for reading at a long wavelength is not always found to be satisfactorily readable with a beam having a short wavelength.

SUMMARY OF THE INVENTION

It is an object of the invention to provide a device which does not have the above-mentioned drawbacks.

The device according to the invention is therefore characterized in that the tracking servosystem is adapted in such a, for reading in the second mode, way that it keeps the read spot at the edge of the track to be read. A record carrier of the second type appears to be accurately readable if, instead of enlarging the read spot, the read spot is caused to follow the edge of the track. The lateral displacement of the spot required for this purpose can be realised without any addition of movable components in the beam.

A device must often be used for reading record carriers of the second type which have the same track period but not the same track width. This is found to operate satisfactorily if the device according to the invention is characterized in that in the second mode the tracking system keeps the center of the read spot at a distance, from the centerline of the track to be read, equal to one fifth of the track period of the second type of record carrier.

In a first embodiment the device is characterized in that the tracking error signal is applied to a first input of an electric circuit in the tracking servosystem whose second input is connected to a switch for adding a DC signal to the tracking error signal in the second mode. The electric circuit gives the tracking servosystem an electrical offset so that the read spot will not follow the centerline, but instead follows the edge of the track.

A detail of the first embodiment of the device is characterized in that the device comprises a circuit for determining the quality of the information signal and for supplying a DC signal which is dependent on said quality. The magnitude of the offset is now determined by the quality of the information signal so that the position of the read spot in the second mode can be optimized.

A second embodiment of the device is characterized by means for generating a tracking beam which forms a tracking spot via the lens system, which tracking spot is located transversely with respect to the scanning spot, and a tracking detection system for receiving tracking beam radiation from the information plane. The device further includes a switch having two inputs and one output which is connected to a control input of the tracking servosystem. The first switch input, which is connected to the switch output in the first mode, is connected to the output of a circuit for generating a tracking error signal from output signals of the first detection system, and the second switch input, which is connected to the switch output in the second mode, is connected to the output of a further circuit for generating a tracking error signal from output signals of the first detection system and the tracking detection system. In the second mode the additional beam is used to generate the tracking error signal. Since the device does not make use of this additional beam in the first mode, the beam can be completely adapted to the geometry of a second type of record carrier.

A third mode of displacement can be used in a device which is characterized by means for generating two transversely offset tracking beams which form two tracking spots via the lens system, which tracking spots are located at both sides of the scanning spot, and two tracking detection systems for receiving radiation of the two tracking beams from the information plane, the device being further provided with a switch having two inputs and one output which is connected to a control input of the tracking servosystem, the first switch input, which is connected to the switch output in the first mode, being connected to the output of a circuit for generating a tracking error signal from output signals of at least the two tracking detection systems, and the second switch input, which is connected to the switch output in the second mode, is connected to the output of a further circuit for generating a tracking error signal from output signals of the first detection system and one of the tracking detection systems. A simple electrical change-over of the tracking servosystem is sufficient to realise a displacement of the spot. The magnitude of the displacement depends on the transverse distance between the tracking spots and the track period of the first and the second type of record carrier.

A preferred embodiment of the device is characterized in that in the second mode one of the tracking spots follows an edge of a track. Since both the read spot and one of the tracking spots follow an edge of the track in the second mode, the tracking error signal can easily be generated as the difference signal of the first detection system and the tracking detection system associated with the tracking spot.

A further embodiment of the device using the third mode of displacement, in which the second wavelength is twice as large as the first wavelength, is characterized in that the transverse distance between the two tracking spots is substantially 1.5 times the track period of a first type of record carrier. This embodiment is suitable, inter alia, in players in which the radiation of the first wavelength is obtained by frequency doubling the radiation of the second wavelength.

If a device according to the invention is characterized in that at least one of the detection systems comprises two detectors whose output signals are applied to the inputs of a differential amplifier, a larger number of combinations of track periods and track widths is possible.

A special embodiment of the device according to the invention is characterized by a type discriminator, an output of which is connected to the tracking servosystem which is driven in such a way that the device is in the mode associated with the type of the record carrier to be read. The device is now automatically set in the correct mode for reading a record carrier.

The invention will be described in greater detail with reference to the accompanying drawings.

DESCRIPTION OF THE PREFERRED EMBODIMENTS

Figure 1:
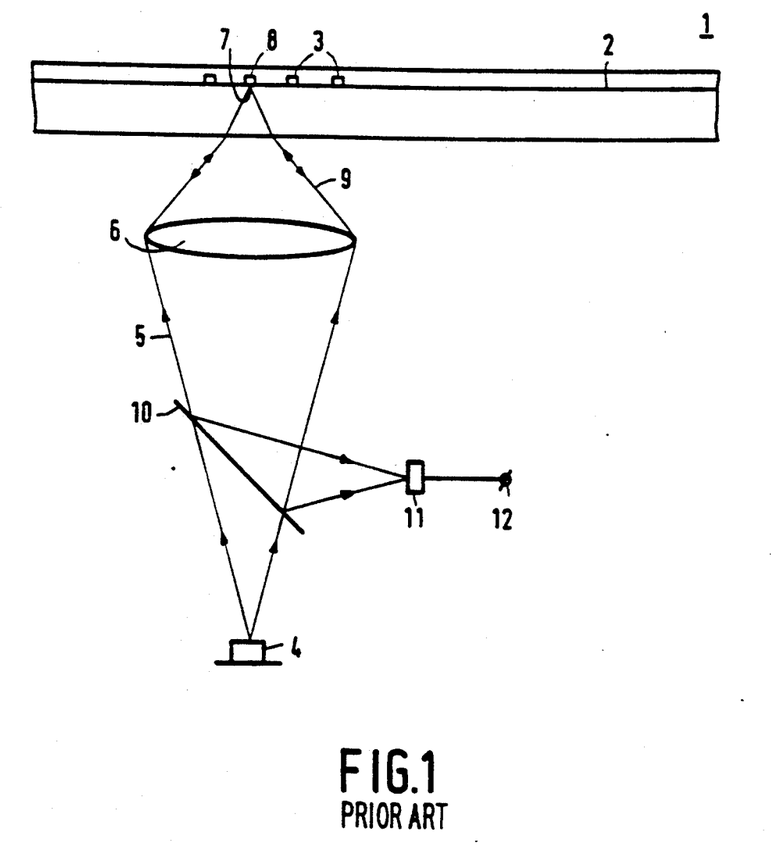
FIG. 1 shows an optical head of a read device.

FIG. 1 shows in a cross-sectional view a part of an optical record carrier 1 which is scanned by a read spot 7 supplied by an optical head of a read device. The record carrier has an information plane 2 in which information is stored in the form of a phase structure. This phase structure may be in the form of pits or bumps on the information plane. The phase structure is arranged in tracks 3 which are perpendicular to the plane of the drawing. The optical head comprises a radiation source 4, for example a diode laser. The radiation beam 5 emitted by the source is focused to the read spot 7 on the information plane 2 by a lens system 6. Servosystems which are not shown in the Figure keep the read spot in the information plane and on a track 8 to be scanned. The radiation beam 9 reflected by the information plane is modulated with the information of the phase structure. A beam splitter 10, for example a partially transparent mirror, passes on the reflected radiation to a radiation-sensitive detection system 11 which converts the beam modulation into an electric information signal 12.

Figure 2A:
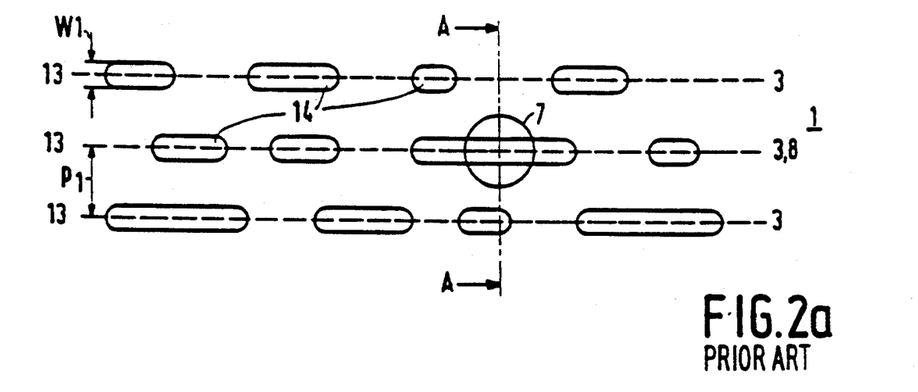
FIG. 2a is a bottom view of a phase structure of a first type of record carrier with a read spot adapted to the phase structure.
Figure 2B:
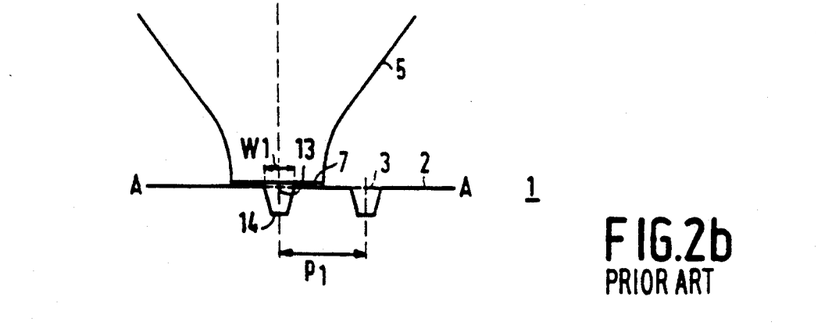
FIG. 2b is a transversal cross-section of the phase structure and the read spot taken on the line A—A in FIG. 2a, FIG. 2c is a tangential cross-section of the phase structure and the read spot of FIG. 2a, FIG. 2d shows the associated information signal.
Figure 2C:
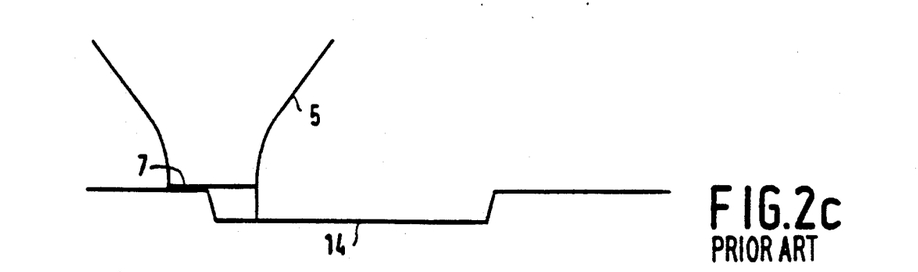
Figure 2D:
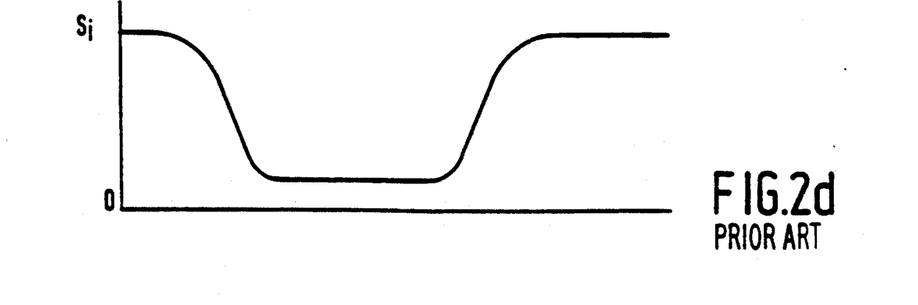

The dimensions of the read spot 7 and the geometry of the phase structure must be adapted to each other to produce a good modulation of the reflected beam 9. This is evident from FIGS. 2a, 2b and 2c which show a phase structure which is adapted to the read spot 7 and is read in reflection. FIGS. 2a and 2b show the information plane 2 in a bottom view and a transverse cross-section, with three juxtaposed tracks 3 having centerlines denoted by broken lines 13. The central track 8 is the track to be read. The distance between the centerlines of juxtaposed tracks, the track period, is denoted by p1. In the record carrier 1 of this example the phase structure is a row of pits, centered on the centerline in which the information is coded in the length of the pits and of the spaces in between. The width of the pits, or the track width, is denoted by w1. FIG. 2b shows the record carrier in a cross-section taken on the line A—A. The radiation beam 5 is focused at the location of a pit 14 in the information plane 2. In the information plane 2 the radiation beam forms a read spot 7 whose size is proportional to the wavelength of the radiation. The intensity in the read spot is generally highest in the center of the spot and decreases towards the edge. The information plane 2 reflects the radiation of the read spot 7 whose diameter is larger than the pit width. The beam portion which is reflected by the bottom of the pit will have traversed a longer path due to the depth of the pit than the beam portion reflected outside the pit. Consequently, a phase difference is produced between the two reflected beam portions so that the beam is phase-modulated. The depth of the pit defines the phase difference between the beam portions; the ratio of the surface area of the read spot 7 within and outside the pit 14 defines the mutual intensity of the two beam portions. Dependent on the phase difference, the beam portions will interfere constructively or destructively on the detection system 11. If the pit depth gives a phase difference of 180° and if equal portions of the radiation are reflected within and outside the pit, it is principally possible to achieve a modulation of 100% of the information signal. In FIG. 2c the pit 14 is shown in a tangential cross-section and FIG. 2d shows the associated information signal 12 denoted by $S_i$ as a function of the position of the read spot 7 with respect to the pit. The largest modulation of the information signal is achieved when the read spot is entirely above the pit.

The device described above having a radiation source 4 which emits radiation of a first wavelength, for example, in the blue part of the spectrum is intended to read a first type of record carrier 1 whose phase structure geometry is adapted to this first wavelength. The track period p1 and the pit width w1 are relatively small, for example 0.8 μm and 0.3 μm, respectively. Reading of this novel type of record carrier is made possible, inter alia, by making use of a conventional diode laser having a wavelength of 0.8 μm in combination with a frequency doubler which converts the diode laser radiation into radiation of half the wavelength. It is desirable that record carriers of a second type designed for reading at a longer wavelength than the first wavelength can also be read by means of this device.

Figure 3A:
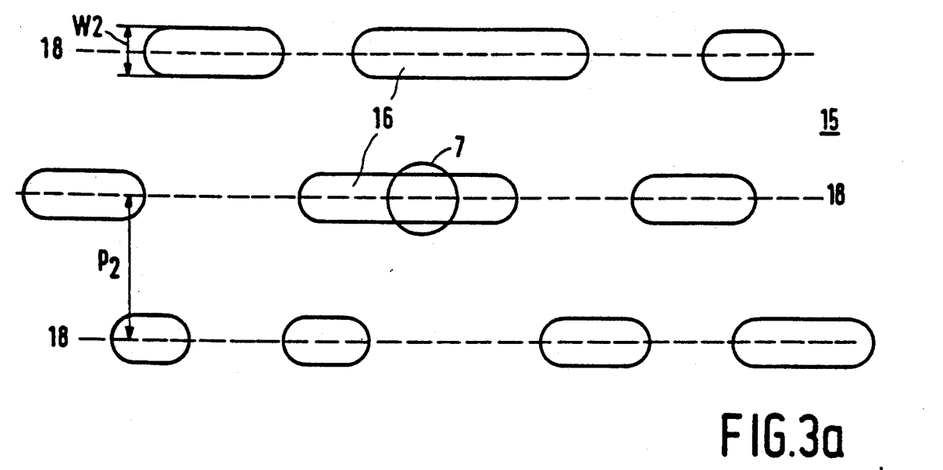
FIG. 3a is a bottom view of a phase structure of a second type of record carrier with a read spot which is too small and which is not adapted to the phase structure.
Figure 3B:
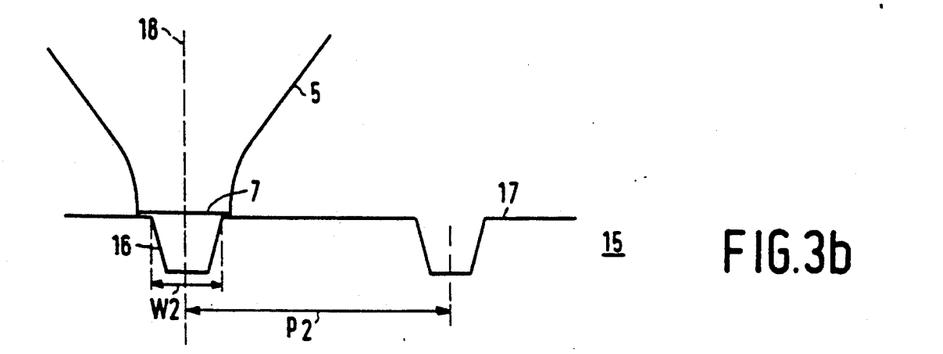
FIG. 3b is a transversal cross-section of the phase structure and the read spot of FIG. 3a, FIG. 3c is a tangential cross-section of the phase structure and the read spot FIG. 3a, FIG. 3d shows the associated information signal.

FIG. 3a shows in a bottom view a part of such a record carrier 15 of the second type, for example, the current audio disc which is known as "Compact Disc" or "CD". This record carrier is optimized for reading by means of a second beam whose wavelength is equal to that of the radiation from said conventional diode laser, which radiation is not doubled in frequency. When the same lens system 6 is used, the second beam forms a second read spot which is twice as large as the first read spot 7 of FIG. 2b. In order that the beam portion reflected by a pit 16 of the second type of record carrier is equally large as the beam portion reflected by the surroundings of this pit when reading with the second read spot, the width w2 of the pit 16 should be twice as large as the width w1 of a pit 14 of the record carrier 1. To be able to read the tracks of the record carrier 15 by means of the second read spot with a minimal amount of crosstalk, the track period p2 of this record carrier should be approximately twice as large as that of the record carrier 1. Moreover, the depth of pit 16 should be twice that of pit 14 so as to obtain a phase difference of 180° between the beam portions when using the second read spot of the second wavelength. If the second record carrier were read with a beam 5 of the first wavelength, there would be the problem that the read spot 7 formed by this beam is not adapted to the geometry of a pit 16. If the center of the read spot 7 is located on the centerline 18 of the track, as is shown in FIG. 3a and in the transversal cross-section of FIG. 3b, the beam portion reflected by the pit is now much stronger than the beam portion reflected by the region outside the pit. Moreover, the phase difference between the beam portions is around 360° due to the larger depth of the pit 16. It will be evident that there will be considerably less destructive interference between the beam portions and that the information signal 12 has a smaller modulation depth.

Figure 3C:
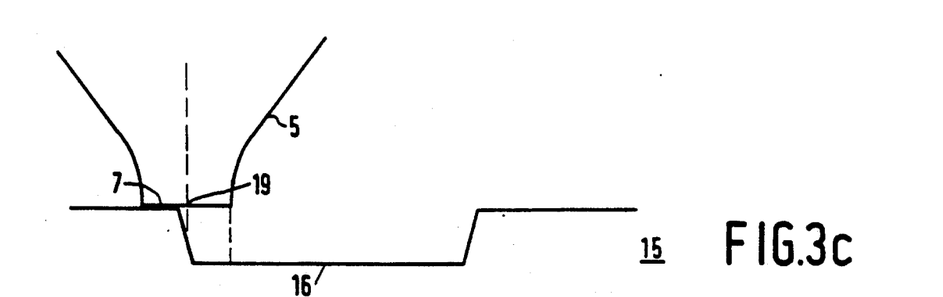
Figure 3D:
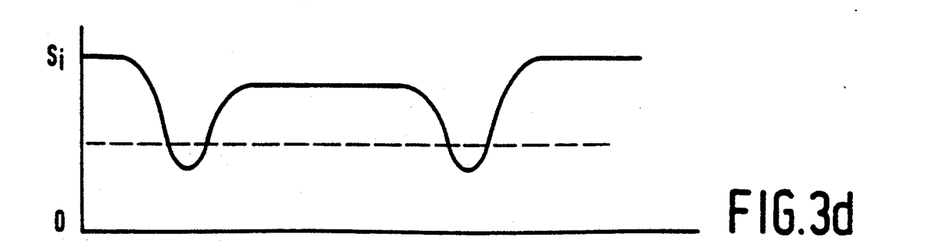

When the pit 16 is being scanned, the read spot 7 will be present above the front edge of the pit for a short time, as is shown in the tangential cross-section in FIG. 3c. The situation then differs from the afore-described case in which the beam is right above the pit. The radiation reflected halfway (that is, from the midpoint of) the slope of the front edge will be shifted approximately 180° in phase with respect to the beam portions which are reflected from three sides outside the pit and from the bottom of the pit. If the centre 19 of the read spot, where there is the highest intensity, is located halfway the slope, the intensity of the beam portion reflected halfway the slope will be comparable with that of the beam portions reflected from the bottom and outside the pit. This causes a destructive interference which leads to a reasonably strong modulation of the information signal 12 at the location of the start of the pit. FIG. 3d shows the variation of the information signal, denoted by $S_i$, as a function of the position of the centre of the read spot 7 with respect to the pit 16. There is a reasonably strong modulation at the location where the read spot enters and leaves the pit, while the modulation in the pit is weak due to the previously described small destructive interference. This distortion of the information signal with respect to the signal in FIG. 2d may cause problems when the information signal is being processed. The device detects the presence of a pit by detecting whether the information signal falls below a given level. In FIG. 3d such a level is shown by way of a broken line. Due to the distortion of the signal two pits instead of one will now be detected. The result is that the second type of record carrier cannot be read satisfactorily or cannot be read at all in this way.

Figure 4A:
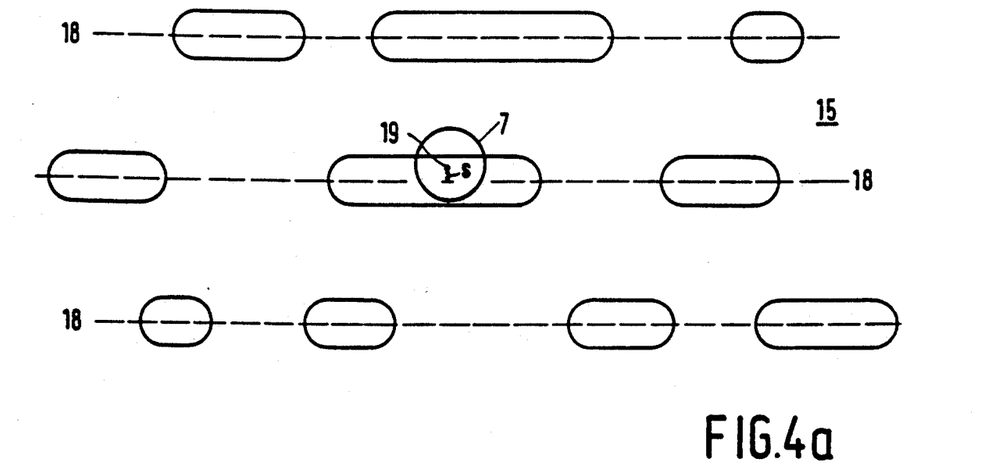
FIG. 4a is a bottom view of a phase structure of a second type of record carrier with a read spot which is transversely offset according to the invention.
Figure 4B:
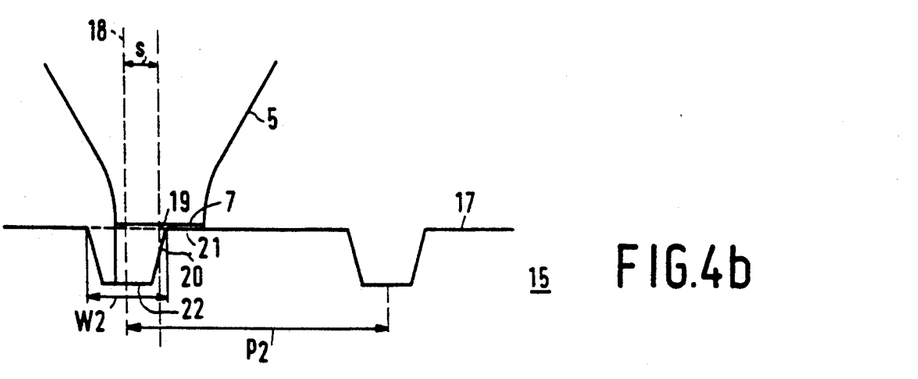
FIG. 4b is a transversal cross-section of the phase structure and the read spot of FIG. 4a, FIG. 4c is a tangential cross-section of the phase structure and the read spot of FIG. 4a, FIG. 4d shows the associated information signal.

The present invention solves this problem and also the tracking problem when the second type of record carrier of the first wavelength is being read and provides a novel device which operates at a wavelength, the smallest of said wavelengths, with which the tracks of the two types of record carrier can be satisfactorily read and followed. This device operates with two read modes. The first mode, which is used for reading the first type of record carrier, is the mode described with reference to FIGS. 2a, 2b, 2c and 2d. When the second type of record carrier is being read, the second mode is used in which the center of the read spot 7 is shifted in the transverse direction, i.e. perpendicular to the tracks 3 towards the edge of the track. FIGS. 4a and 4b show a read spot 7 shifted over a distance s from the centerline 18 of the track. Since the center 19 of the read spot 7, the part having the highest intensity, is now located above a slope 20 of the pit, the influence of this slope on the reflected beam has increased with respect to the situation shown in FIG. 3a. The phase of the reflected radiation varies from 0° for the beam portion reflected in the area 21 outside the pit to 180° for radiation reflected halfway the slope 20, to approximately 360° for radiation reflected on the bottom 22 of the pit. The beam portion reflected by area 21 and the bottom 22 will therefore interfere destructively with the beam portion reflected halfway the slope 20. The intensity of the beam portion which is reflected halfway the slope is dependent on the steepness of the slope. Experiments have proved that an angle of inclination of between 30° and 70° yields good results. This is also the region in which record carriers can be made satisfactorily by means of an injection moulding process. Due to the high intensity of the beam 5 in the center 19 the two beam portions will be comparable in intensity in the case of an angle of inclination within said limits and will yield a reasonable modulation of the reflected beam 9. This in its turn results in a satisfactory modulation of the output signal of the detection system 11, and hence a satisfactory readout of the information stored on the record carrier 15. In the situation of FIG. 3a, with an unshifted read spot 7, there will also be destructive interference between the beam portion reflected on the center of the slopes 20 and the beam portion reflected by the area next to the pit and by the bottom 22. However, since the greatest intensity of the beam 5 is at the location of the bottom 22 in this case, the intensities of the beam portions will be greatly different. Therefore, there is less destructive interference so that the record carrier 15 in the situation of FIG. 3a is less easily readable than in the situation of FIG. 4a.

Figure 4C:
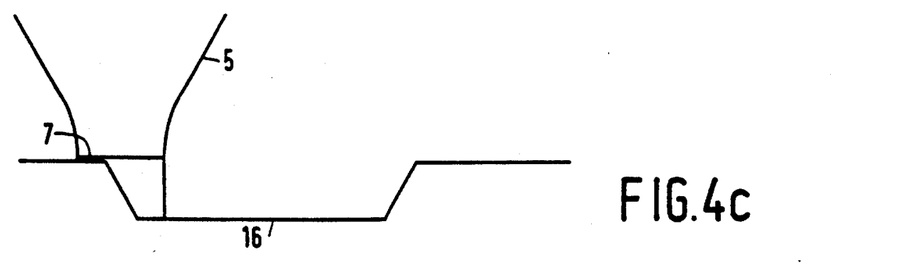
Figure 4D:
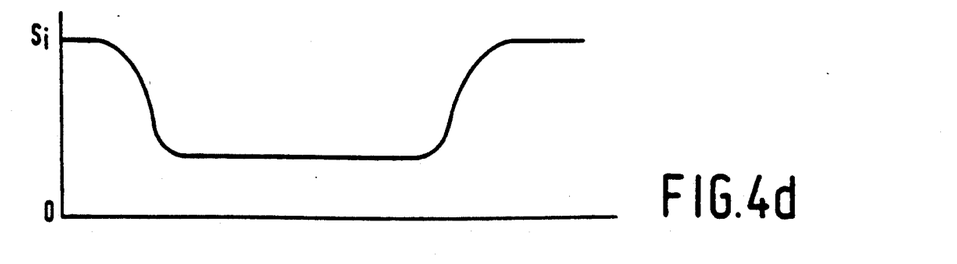

If the read spot 7 is located above the front edge of the pit 16 when the pit is being scanned, as is shown in FIG. 4c, there will be the same strong modulation of the information signal as in the case of FIG. 3c. However, since the modulation in the center of the pit is now much stronger than in FIG. 3c, the information signal will no longer fall below the level which is reached with the read spot halfway the edge of the pit. The information signal $S_i$ shown in FIG. 4d has the same regular variation during readout according to the invention as the information signal of FIG. 2d in the conventional device and can thus be processed satisfactorily. The modulation depth of the information signal depends on the slope 20, the diameter of the read spot 7 and the shift s and is generally slightly smaller than when reading with the read spot for which the record carrier has been designed. However, this can be corrected by means of an extra amplification.

The value of the shift s for obtaining a satisfactory information signal is not critical. It is found that a satisfactory information signal is obtained at shifts s of between 0.2 w2 and 0.9 w2. Satisfactory use can be made thereof if record carriers having a large variation of certain dimensions must be read. For example, in Compact Discs there is little spread in the track period p2 but much spread in the track width w2. It is found that for a shift s of between 0.1 and 0.3, preferably 0.2 times the track period p2, most record carriers of the second type can be read satisfactorily, irrespective of the track width and the diameter of the read spot. Consequently, a device need not adapt the shift to the record carrier of the second type to be read, but can use a fixed shift in the second mode. Although the invention has been described with reference to a pit-shaped phase structure, it will be evident that the principle is effective for all phase structures, inter alia, bump-shaped phase structures. The ratio between the first and the second wavelength need not be a factor of two; the described principle is also effective for factors of one and a half or three and the tolerances for the shift remain valid.

Figure 5:
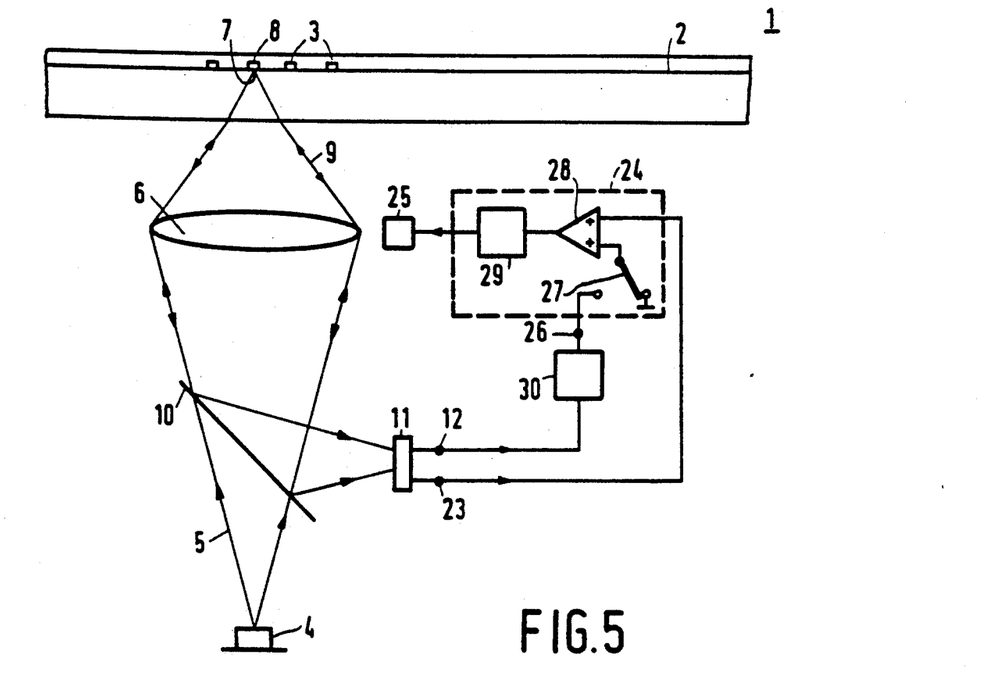
FIG. 5 shows an optical head with a tracking servosystem for tracking in accordance with a first mode.

There are various embodiments of the device according to the invention in which in the second mode the read spot 7 is shifted in the transverse direction. A first embodiment is shown in FIG. 5. A tracking error signal 23 representing the deviation between the center of the read spot 7 and the centerline 13 of the track 8 to be scanned is obtained from the detection system 11. This signal is applied to a tracking servosystem 24, providing an input signal for a driver 25 for, for example, the transverse displacement of the objective lens 6. A transverse displacement of the lens 6 also results in a transverse displacement of the read spot 7. The tracking error signal 23 can be generated in different ways. As described in U.S. Pat. No. 4,491,940, the detection system may comprise two parts and the difference between the output signals of the two parts is a measure of the tracking error. In a tracking error signal generation method known from U.S. Pat. No. 3,376,842 two tracking spots are formed at both sides of the read spot. The two radiation beams from the tracking spots are detected by separate detectors and the difference between the output signals of the detectors is a measure of the tracking error.

The shift s of the read spot required for the second mode can be realised by applying a control signal 26 from a DC source 30 to the tracking servosystem 24. This voltage source is connected via a switch 27 to an input of an electric circuit 28, for example, a summing amplifier of the tracking servosystem 24. If the device is to read a record carrier 1 of the first type in the first mode, the switch 27 applies a zero voltage to the circuit 28. If the device is to read a record carrier 15 of the second type in the second mode, the switch 27 applies the control signal 26 to the summing amplifier 28. In the summing amplifier 28 the tracking error signal 23 and the control signal 26 are combined in such a way that the output signal is a DC-shifted tracking error signal. This signal controls the driver 25 via a further servocircuit 29, for example, an amplifier. Due to the DC shift the read spot will no longer follow the centerline 13 of the track 8 to be scanned but at a transversal distance therefrom which is determined by signal 26. It will be evident that in the first mode the read spot 7 will follow the centerline 13 of the track 8. The position of the switch 27 determines whether the device is either in the first or in the second mode. The circuit 30 supplying the control signal 26 may not only be a DC source but also a circuit in which the quality of the information signal 12 is determined by checking, for example, voltage levels of the information signal or by measuring the frequency of errors after A/D conversion and by correcting the value of the control signal 26 by means of these data in such a way that the quality of the information signal in the second mode will be as high as possible. Since the circuit 30 should determine the maximum value of the quality, it may be necessary to give the read spot a small transversal wobble. The maximum value can then be easily determined from the resultant variation in the quality of the information signal.

Figure 6:
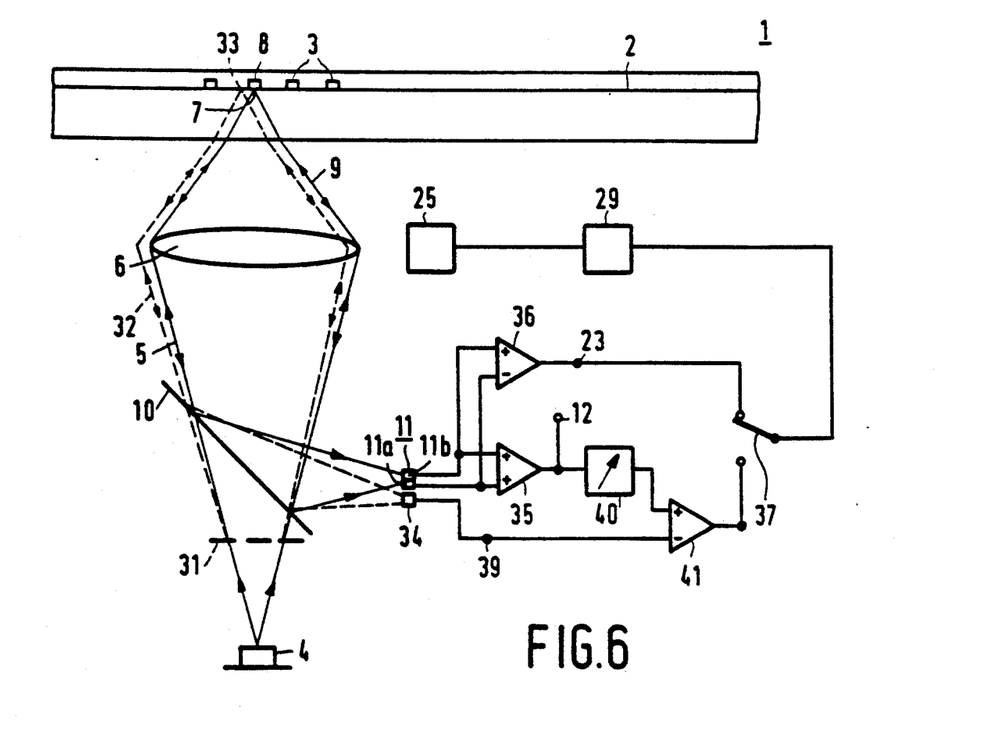
FIG. 6 shows an optical head for tracking in accordance with a second mode.
Figure 7A:
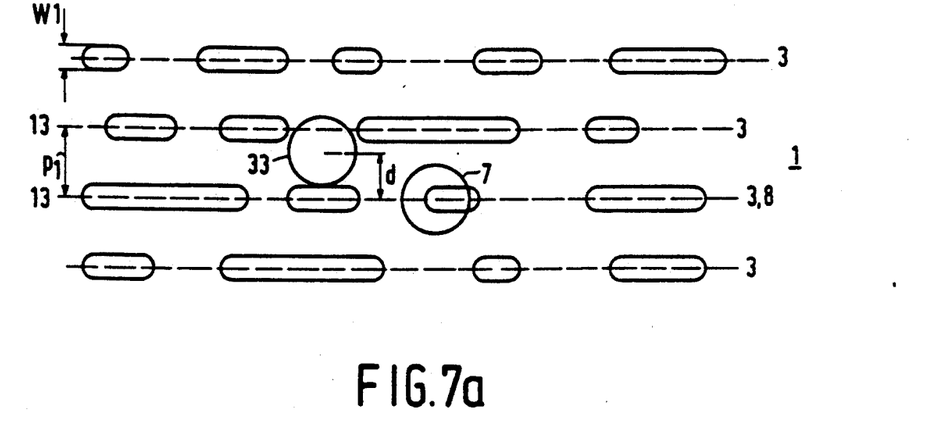
FIGS. 7a and 7b show the positions of the spots in accordance with the second mode of tracking on a phase structure of a record carrier of the first and the second type.

A second embodiment of the device according to the invention for shifting the read spot 7 in the transverse direction is shown in FIG. 6. In this Figure a tracking beam 32 is split from the radiation beam 5 by means of a grating 31. To concentrate the radiation as much as possible in the on-going radiation beam or read beam 5 and the diffracted tracking beam 32, the grating 31 can be blazed. The tracking beam forms a tracking spot 33 next to the read spot 7 in the information plane 2. A tracking detection system 34 detecting the radiation from the tracking spot 33 is adjacent to the detection system 11. The position of the spots 7 and 33 on a first type of record carrier is shown in FIG. 7a. The center of the read spot 7 follows the centerline 13 of the track 8 to be scanned. The center of the tracking spot 33 is shifted over a distance d with respect to the same centerline 13. In this embodiment the tracking spot is not used when reading a record carrier of the first type. Both the information signal and the tracking error signal are derived from the read spot 7 in this first mode. To this end the detection system 11 in FIG. 6 is divided into two halves 11a and 11b. A summing amplifier 35 forms the sum of the output signals of the two halves; the output signal of the summing amplifier is the information signal 12. A differential amplifier 36 provides the push-pull signal of the detection system 11, i.e. the difference signal of the two halves. This signal is the tracking error signal 23 and is applied via a switch 37 set in a first position to the servocircuit 29 for the tracking.

Figure 7B:
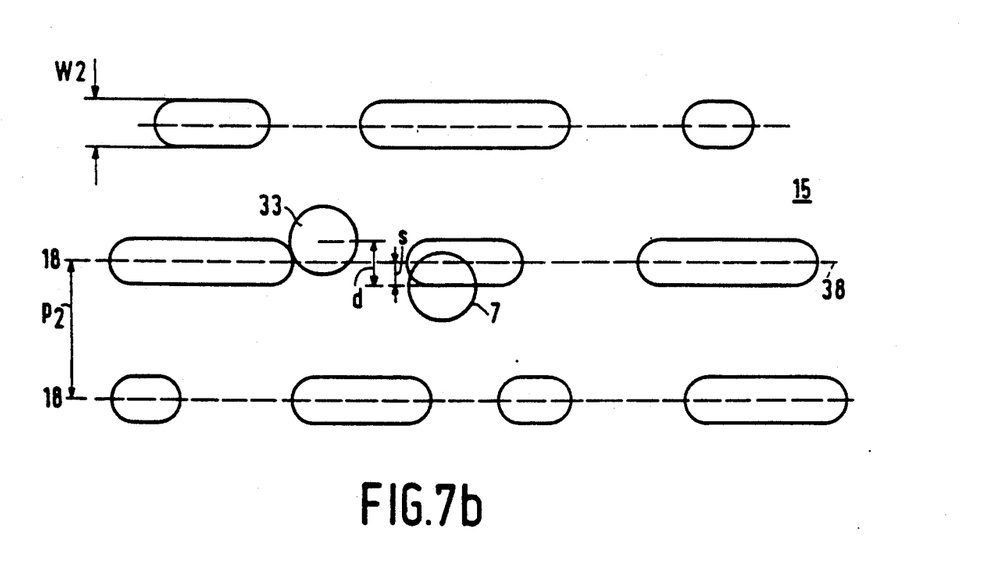

The position occupied by the spots 7 and 33 during the second mode on a second type of record carrier is shown in FIG. 7b. The center of the read spot 7 is shifted over a distance s of the centerline 18 of a track 38 to be read and now follows the edge of the track 38. The transverse distance d between the centers of the read spot and the tracking spot is chosen to be such that the tracking spot 33 follows the other edge of track 38 in the second mode. The sum signal of detection system 11 is again the information signal 12. The difference between the information signal 12 and the detector signal 39 of the detection system 34 is now used as a tracking error signal. Since the intensity of the radiation beam 5 is generally larger than that of the tracking beam 32, the signals of the detection systems 11 and 34 must be adapted before they are subtracted from each other. This has been done in FIG. 6 by means of an attenuator 40 which attenuates the information signal 12 by a factor which is equal to the intensity ratio between beams 5 and 32. A differential amplifier 41 forms the difference signal of the output of the attenuator 40 and the signal 39. The difference signal is subsequently applied as a control signal via the switch 37 set in a second position to the servocircuit 29 for the tracking.

The necessary shift s is determined by the width w2 of the tracks 3 in the second type of record carrier and by the size of the read spot. The distance d between the spots is equal to 2s and is independent of the track period p2. Consequently, the second embodiment of the device can read record carriers of the second type with different or varying track periods. It will be evident that the tracking spot 33 in FIG. 7b may be shifted over an integral number of tracks. In the second mode the tracking spot 33 may alternatively be located exactly between two tracks. The tracking error signal is then the push-pull signal of a detection system 34 divided into two halves, which signal can be generated in the same way as the push-pull signal of detection system 11. To obtain a satisfactory push-pull signal, the dimension of the tracking spot must be sufficiently large with respect to the track period p2.

Figure 8:
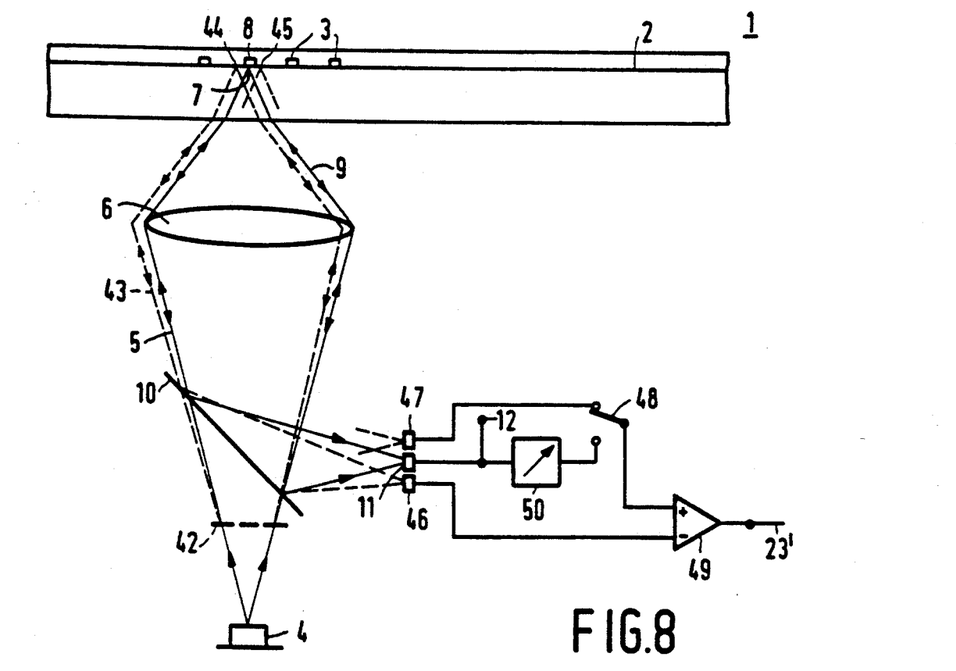
FIG. 8 shows an optical head for tracking in accordance with a third mode.
Figure 9A:
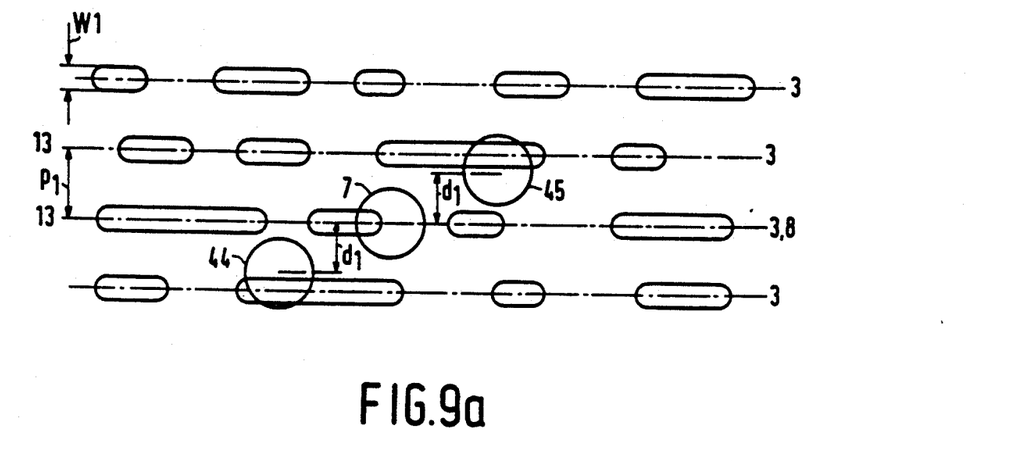
FIGS. 9a and 9b show the positions of the spots in accordance with the third mode of tracking on a phase structure of a record carrier of the first and the second type.
Figure 9B:
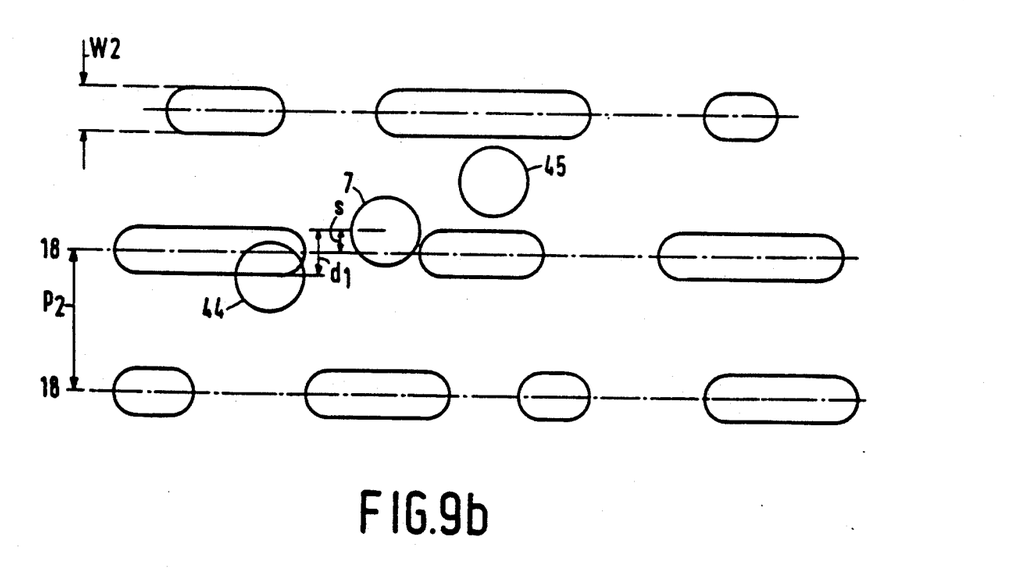

In a third embodiment of the device according to the invention the method of generating a tracking error signal by means of two tracking spots, which method is known per se from U.S. Pat. No. 3,876,842, is used in the first mode. This embodiment is shown in FIG. 8. The radiation beam from the source 4 is split into a read beam 5 and two tracking beams 43 by means of a grating 42. For the sake of clarity only one tracking beam is completely shown by way of broken lines. The tracking beams form two tracking spots 44 and 45 at both sides of the read spot 7. The detection system 11 detects the radiation from the read spot 7 and two tracking detection systems 46 and 47 detect the radiation from tracking spots 44 and 45, respectively. The position of the read spot and the tracking spots occupied on the information plane 2 of a first type of record carrier 1 during the first mode is shown in FIG. 9a. The center of the read spot 7 follows the centerline 13 of the track 8 to be read. The centers of the two tracking spots are located at a distance d1 from this centerline at both sides of the read spot. In this first mode the output signal of detection system 11 is the information signal 12 and the tracking error signal is derived from the signals of the detection systems 46 and 47. To this end the output signal of detection system 47 is applied to a differential amplifier 49 via a switch 48 in a first position. The output signal of the detection system 46 is applied to the other input of the differential amplifier. The output signal of the differential amplifier 49 is the desired tracking error signal 23'. In the second mode the center of the read spot 7 is shifted over a distance s from the centerline 18 so that the read spot follows the edge of the track to be read on a second type of record carrier as is shown in FIG. 9b. The tracking spot 44 follows the other edge of the track. The information signal 12 is again the output signal of detection system 11. According to the invention, the tracking error signal is now derived from the output signals of detection systems 11 and 46. Similarly as in the device shown in FIG. 6, the output signal of the detection system 11 must be attenuated by an attenuator 50 before it is applied to the differential amplifier 49 via the switch 48 in a second position. The output signal of the differential amplifier 49 is the tracking error signal 23'.

If the distance d1 is equal to three quarters of the track period p1, an optimum tracking error signal 23' is obtained in the first mode. The mutual distance between the tracking spots 44 and 45 then is 1.5 times the track period p1. To obtain a satisfactory information signal 12 in the second mode, the shift s, which is maintained equal to ½ d1 by the tracking system, should be between 0.2 w2 and 0.9 w2, with w2 being the width of the tracks 3 of a second type of record carrier 15. A second type of record carrier in which p2=3 w2 and p2=2 p1, in conformity with the international standard for the Compact Disc, is found to be eminently readable in the second mode. If p2 is not equal to 2 p1 but, for example, to 1.5 p1, the center of the tracking spot 45 on a second type of record carrier will follow a track next to the track to be read. Instead of using the difference between the detector signals of the spots 7 and 44, it is also possible to use the difference between the detector signals of spots 7 and 45 for generating a tracking error signal.

Figure 10:
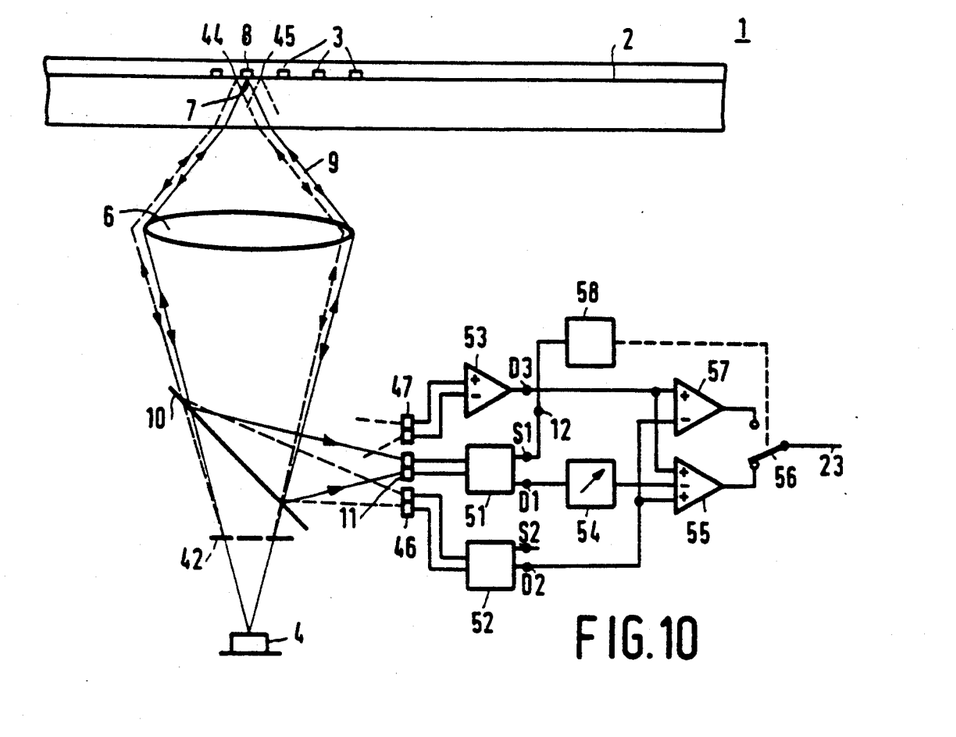
FIG. 10 shows an optical head for tracking in accordance with a fourth mode.
Figure 11A:
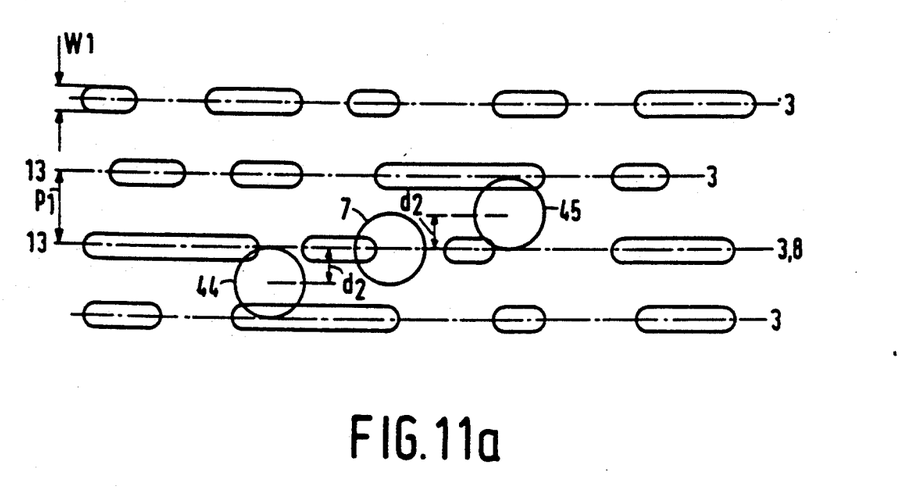
FIGS. 11a and 11b show the positions of the tracks in accordance with the fourth mode of tracking on a phase structure of a record carrier of the first and the second type. Identical reference numerals in the different figures refer to the same components.
Figure 11B:
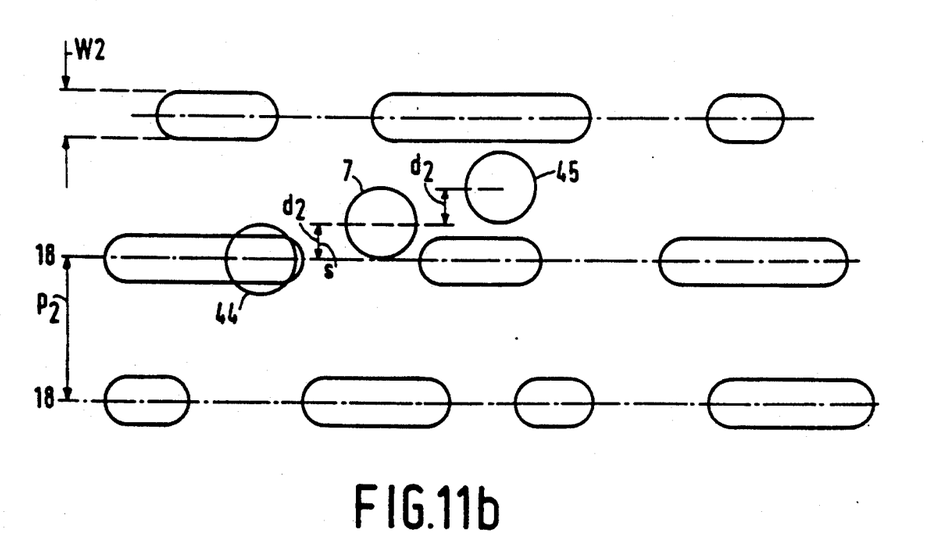

A fourth embodiment of the device according to the invention is a modification of the third embodiment described hereinbefore. In the fourth embodiment, shown in FIG. 10, the read spot 7 and the two tracking spots 44 and 45 are generated in the same way as in the device of FIG. 8. The positions of the read spot and the tracking spots on the information plane 2 of a first type of record carrier 1 in the first mode are shown in FIG. 11a. The center of the read spot 7 follows the centerline 13 of the track 8 to be read. The two tracking spots are located at a distance d2 from this centerline at both sides of the read spot. In this first mode the tracking error signal is derived by means of the signals of the detection systems 46 and 47. The three detection systems 11, 46 and 47 comprise two halves each. The output signals of the two halves of detection system 11 are processed to a sum signal and a difference signal in a circuit 51, which is shown in the Figure by means of S1 and D1, respectively. The circuit 51 may comprise the summing and differential amplifiers 35 and 36 of FIG. 6. The sum signal S1 of circuit 51 is the information signal 12. A circuit 52, which is comparable with circuit 51, forms a sum signal and a difference signal S2 and D2 from the halves of the detection system 46. A differential amplifier 53 forms a difference signal D3 from the halves of the detection system 47. The tracking error signal may be formed by signal D2 or D3 only, or by the sum of D2 and D3. If signal D1 is available, a stable tracking error signal can be generated by means of a combination of the signals D1, D2 and D3, as is known from European Patent Application No. 0,201,603. In that case signal D1 is multiplied by a constant in a circuit 54 and subsequently subtracted from the sum of the signals D2 and D3 in an amplifier 55. The output signal of the amplifier 55 is the tracking error signal which is applied via a switch 56 in a first position to a servocircuit for the tracking. In the second mode the center of the read spot is shifted over a distance s equal to d2 with respect to the centerline 18 so that the center of the read spot follows the edge of the track to be read on a second type of record carrier, as is shown in FIG. 11b. The center of the tracking spot 44 will then follow the centerline 18 of the track to be read. The difference signal D2 of the associated detection system 46 can be used as a tracking error signal. If the tracking spot 45 in FIG. 11b moves approximately right between two tracks and has sufficiently large dimensions with respect to the track period p2, a stable tracking error signal can be obtained by forming the difference signal from the signals D2 and D3 by means of a differential amplifier 57. The output signal of the differential amplifier 57 can be applied to the servocircuit via switch 56 in a second position.

A satisfactory tracking error signal in the first mode can be obtained with the fourth embodiment if d2 is equal to half the track period p1 of a first type of record carrier. If the track period p2 of a second type of record carrier is twice as large as p1, the center of the tracking spot 45 on a second type of record carrier will be exactly between two tracks and will consequently also provide a satisfactory tracking error signal in the second mode. The presence of a groove between the tracks results in a further improvement of the tracking error signal. If p2 is one and a half times p1, the read spot 7 can be shifted over a quarter of p1 in the second mode so that the centers of the read spot and the tracking spot 44 extend along the two edges of the track to be read. In this case the tracking error signal is then the difference between the sum signals S2 and S1.

The four embodiments will have made it clear that an optical head with which the two record carriers are readable can be designed for any combination of track periods p1, p2 and track widths w1, w2 of a first and a second type of record carrier. The tracking error signal may generally be generated in accordance with one of said methods or a combination thereof. Said ample tolerance of the relationship between the shift s of the read spot and the track width w2 is very advantageous in this case: the center of the read spot need not exactly follow the edge of the track in the second mode so as to obtain a satisfactory information signal. This provides more freedom in placing the spots on and between the tracks. Although the operation of the two modes of the device has been explained with reference to two types of record carrier both of which have a phase structure, the presence of an information-containing phase structure is only necessary in the second type of record carrier. In the first type of record carrier the information may alternatively be stored in, for example, amplitude structures such as areas having a different reflection or magnetic domains. The two record carrier types may also have grooves to guide the read spot.

If the device is to function correctly, it is necessary that the mode associated with the type of the record carrier to be read is selected by means of the switch 27, 37, 48 or 56. For this purpose the device may be provided with a type discriminator 58 which can determine the type of a record carrier to be read and with reference to which the position of the switch is set. Such a discriminator is applicable in all devices described and has been shown in FIG. 10 by way of example. A first possibility of determining the type of record carrier is for the discriminator to read a type mark on the record carrier and to derive the type of record carrier from this mark. The type discriminator may then set the switch in the position for the first mode, for example, when the mark is present, and in the second mode when the mark is absent. The mark can be detected by means of a separate sensor or by means of the optical head. In the latter case it should also be possible to read the mark satisfactorily when the device is in the second mode, i.e. with the read spot on the edge of the track. This can be realised with a mark comprising a phase structure of the second type or a kind of bar code in which the bars are perpendicular to the track direction so that the code can be read without having to follow tracks on the record carrier. A second possibility of determining the type in which the record carriers need not be provided with a mark is to have a discriminator measure the quality of the information signal in accordance with a method analogous to that of the circuit 30. If the mode with which the device starts reading the record carrier yields too many errors in the information signal, the discriminator may decide to use the other mode for reading. It is also possible to try out the two modes at the start of reading a record carrier and then select the mode yielding the information signal of the highest quality.

Although only the read function of the devices according to the invention has been described, it is also possible to write on the record carriers with these devices, in which case the scanning spot is a write spot which follows the track to be written and has a larger intensity than a read spot.

We claim:

1. An optical scanner device for scanning record carriers of a first and second type, using a first and a second mode respectively, wherein each type of record carrier has an information plane formed by a structure arranged in tracks having respective centerlines and containing information, said structure of said second type being a phase structure, said first type being designed for scanning by radiation of a first wavelength, and said second type being designed for scanning by radiation of a second wavelength longer than said first wavelength, said device comprising a radiation source for supplying a radiation beam of said first wavelength, a lens system for focusing the radiation beam to a read spot on the information plane, at least one detection system, means for providing a tracking error signal, and a tracking servo system controlled by said tracking error signal for keeping the read spot on the centerline of a track to be scanned in the first mode, and said at least one detection system including a first detection system for converting read spot radiation from the information plane into an information signal, characterized in that said tracking servo system is arranged such that, in said second mode, it keeps said read spot at the edge of the track to be scanned.

2. A device as claimed in claim 1, for use with carriers of said second type having a track period, characterized in that in said decond mode the tracking system keeps the center of the read spot at a distance, from the centerline of the track to be scanned, equal to one-fifth of said track period.

3. A device as claimed in claim 2, characterized in that the tracking error signal is applied to a first input of an electric circuit in the tracking servosystem whose second input is connected to a switch for adding a DC signal to the tracking error signal in the second mode.

4. A device as claimed in claim 3, characterized in that it comprises a circuit for determining the quality of the information signal and for supplying the DC signal which is dependent on said quality.

5. A device as claimed in claim 2, characterized by means for generating a tracking beam which forms a tracking spot via the lens system, which tracking spot is located transversely with respect to the read spot, and a tracking detection system for receiving tracking beam radiation from the information plane, the device being further provided with a switch having two inputs and one output which is connected to a control input of the tracking servosystem, the first switch input, which is connected to the switch output in the first mode, being connected to the output of a circuit for generating a tracking error signal from output signals of the first detection system, the second switch input, which is connected to the switch output in the second mode, being connected to the output of a further circuit for generating a tracking error signal from output signals of the first detection system and the tracking detection system.

6. A device as claimed in claim 2, characterized by means for generating two tracking beams which form two tracking spots via the lens system, which tracking spots are transversely offset and located at both sides of the read spot, and two tracking detection systems for receiving radiation of the two tracking beams from the information plane, the device being further provided with a switch having two inputs and one output which is connected to a control input of the tracking servosystem, the first switch input, which is connected to the switch output in the first mode, being connected to the output of a circuit for generating a tracking error signal from output signals of at least the two tracking detection systems, the second switch input, which is connected to the switch output in the second mode, being connected to the output of a further circuit for generating a tracking error signal from output signals of the first detection system and one of the tracking detection systems.

7. A device as claimed in claim 6, characterized in that in the second mode one of the tracking spots follows an edge of a track.

8. A device as claimed in claim 7, in which the second wavelength is twice as large as the first wavelength, characterized in that the transverse distance between the two tracking spots is substantially 1.5 times the track period of a first type of record carrier.

9. A device as claimed in claim 1, characterized in that said at least the detection system comprises two detectors whose output signals are applied to the inputs of a differential amplifier.

10. A device as claimed in claim 1, characterized by comprising a type discriminator, an ouput of which is connected to the tracking servosystem for setting the device in the mode associated with the type of the record carrier to be read.

11. A device as claimed in claim 5, characterized in that in the second mode said tracking spot follows an edge of a track.

12. A device as claimed in claim 1, characterized in that the tracking error signal is applied to a first input of an electric circuit in the tracking servosystem whose second input is connected to a switch for adding a DC signal to the tracking error signal in the second mode.

13. A device as claimed in claim 1, characterized by means for generating a track beam which forms a tracking spot via the lens system, which tracking spot is located transversely with respect to the read spot, and a tracking detection system for receiving tracking beam radiation from the information plane, the device being further provided with a switch having two inputs and one output which is connected to a control input of the tracking servosystem, the first switch input, which is connected to the switch output in the first mode, being connected to the output of a circuit for generating a tracking error signal from output signals of the first detection system, the second switch input, which is connected to the switch output in the second mode, being connected to the output of a further circuit for generating a tracking error signal from output signals of the first detection system and the tracking detection system.

14. A device as claimed in claim 13, characterized in that in the second mode said tracking spot follows an edge of a track.

15. A device as claimed in claim 1, characterized by means for generating two tracking beams which form two tracking spots via the lens system, which tracking spots are transversely offset and located at both sides of the read spot, and two tracking detection for receiving radiation of the two tracking beams from the information plane, the device being further provided with a switch having two inputs and one output which is connected to a control input of the tracking servosystem, the first switch input, which is connected to the switch output in the first mode, being connected to the output of a circuit for generating a tracking error signal from output signals of at least the two tracking detection systems, the second switch input, which is connected to the switch output in the second mode, being connected to the output of a further circuit for generating a tracking error signal from output signals of the first detection system and one of the tracking detection systems.

16. A device as claimed in claim 15, characterized in that in the second mode one of the tracking spots follows an edge of a track.

17. An optical scanner device for scanning record carriers of a first and second type, using a first and a second mode respectively, wherein each type of second record carrier has an information plane formed by a structure arranged in tracks having respective centerlines and containing information, said structure of said second type being a phase structure, said first type being designed for scanning by radiation of a first wavelength, and said second type being designed for scanning by radiation of a second wavelength longer than said first wavelength, said device comprising a radiation source for supplying a radiation beam of said first wavelength, a lens system for focusing the radiation beam to a read spot on the information plane, at least one detection system, means for providing a tracking error signal, and a tracking servo system controlled by said tracking error signal for keeping the read spot on the centerline of a track to be scanned in the first mode, and said at least one detection system including a first detection system for converting read spot radiation from the information plane into an information signal, characterized in that, in said second mode, said read spot is formed by focusing said radiation beam of said first wavelength by said lens system to a same said read spot, and said tracking servo system is arranged such that, in said second mode, it keeps said read spot at the edge of the track to be scanned.

18. A device as claimed in claim 17, for use with carriers of said second type having a track period, characterized in that in said second mode the tracking system keeps the center of the read spot at a distance, from the centerline of the track to be scanned, equal to one-fifth of said track period.

19. A device as claimed in claim 17, for use with carriers of said second type having a phase structure formed by marks having sloping edges, characterized in that in said second mode the tracking system keeps the center of the read spot aligned approximately at the mid-point of one of said slopes.

* * * * *